United States Patent [19]

Williams

[11] 4,082,873

[45] Apr. 4, 1978

[54] SWITCH-PROOF LABEL

[75] Inventor: Frederick P. Williams, Kettering, Ohio

[73] Assignee: Monarch Marking Systems, Inc., Dayton, Ohio

[21] Appl. No.: 737,950

[22] Filed: Nov. 2, 1976

[51] Int. Cl.[2] .......................... B32B 3/18; B32B 7/10; B32B 7/12; C09J 7/02

[52] U.S. Cl. ...................................... 428/40; 40/2 R; 283/9 R; 428/202; 428/203; 428/204; 428/354; 427/207 R; 427/258

[58] Field of Search .................. 40/2 R, 2.2; 283/8 R, 283/8 B, 9 R; 428/40, 202, 204, 203, 354; 427/207, 258

[56] References Cited

U.S. PATENT DOCUMENTS

| | | | |
|---|---|---|---|
| 3,152,901 | 10/1964 | Johnson | 428/203 |
| 3,631,617 | 1/1972 | Pekke et al. | 428/204 |

FOREIGN PATENT DOCUMENTS

| | | | |
|---|---|---|---|
| 1,269,514 | 4/1972 | United Kingdom | 428/204 |

*Primary Examiner*—J.C. Cannon

*Attorney, Agent, or Firm*—Jones, Tullar & Cooper

[57] ABSTRACT

This invention relates to switch-proof labels useful for marking objects in a manner such that if one were to attempt to transfer the label to another object the label would be destroyed or defaced to such an extent that its transference would be noticeable. The label comprises laminate comprising a transparent or translucent outer sheet having an information containing pattern printed on its inner surface, said printed inner surface having a coating of pressure sensitive adhesive film coated thereon. The printed pattern has a lesser affinity for the outer sheet than the printed pattern has for the adhesive. The affinity of the adhesive for the surface to which the laminated label is adhered and to the printed pattern is greater than the affinity of the printed pattern for the outer sheet. In a preferred embodiment the free side of the adhesive film of the label is covered by a release sheet. Once applied to a substrate, if removal of the label is attempted, the label delaminates in a manner such that the outer sheet separates leaving at least a portion of the adhesive layer, having at least a portion of the printed pattern adhering thereto, adhered to the substrate.

6 Claims, 2 Drawing Figures

FIG. 1
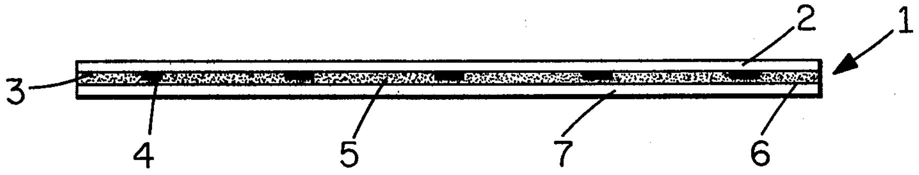
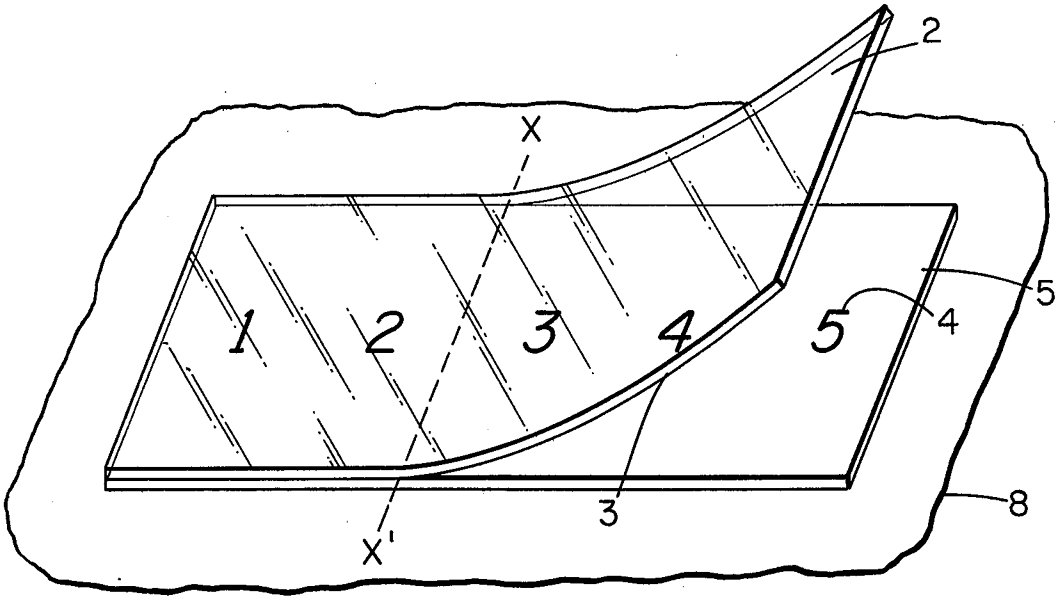
FIG. 2

SWITCH-PROOF LABEL

STATE OF THE ART

Objects are frequently marked or identified with the intention that the marking be either "permanent" or uniquely characteristic of the object or objects so marked. Examples of such markings include ownership information, serial numbers, licenses, permits, statutorily required information, and certification that an object possesses certain characteristics or conforms to certain statutory requirements.

Various methods are employed to achieve these results. The use of relatively convenient and inexpensive labels presents problems in that, if the label can be switched from one object to another, in a manner that is not readily detectable, the validity of the information contained on the label is sbject to question.

U.S. Pat. No. 3,152,901, to Johnson, shows a credit card which, when delaminated, causes a photographic image to be defaced. The concept employed is significantly different than that described here.

U.S. Pat. No. 3,494,818, to Marchese, shows a laminated label having "buried" printing.

U.S. Pat. No. 3,925,584, to Suzuki et al, shows a laminated sealing tape which is tamper proofed, inter alia, by the use of adhesive layers of varying bond strengths.

SUMMARY OF THE INVENTION

This invention relates to switch-proof labels useful for marking objects in a manner such that if one were to attempt to transfer the label to another object the label would be destroyed or defaced to such an extent that its transference would be noticeable.

The label comprises a laminate comprising a transparent or translucent outer sheet having an information containing pattern printed on its inner surface, said printed inner surface having a coating of pressure sensitive adhesive film coated thereon. The printed pattern has a lesser affinity for the outer sheet than the printed pattern has for the adhesive. The affinity of the adhesive for the surface to which the laminated label is adhered and to the printed pattern is greater than the affinity of the printed pattern for the outer sheet.

In a preferred embodiment, the free side of the adhesive film of the label is covered by a release sheet.

Once applied to a substrate, if removal of the label is attempted, the label delaminates in a manner such that the outer sheet separates leaving at least a portion of the adhesive layer, having at least a portion of the printed pattern adhering thereto, adhered to the substrate.

BRIEF DESCRIPTION OF THE DRAWINGS

FIG. 1 is a schematic representation of the label of the invention with a release sheet in place.

FIG. 2 is a representation of the label, upon an object, in a state of partial delamination.

DESCRIPTION OF THE PREFERRED EMBODIMENTS

With reference to FIG. 1, the label of the invention 1 comprises an external layer of flexible transparent or translucent plastic film 2. The film has sufficient transparency or translucency so that a pattern printed on one side is visible through the film. The chemical nature of the plastic film is not critical so long as it has sufficient film integrity for its intended use and provides a surface which has appropriate ink affinity characteristics as set forth hereinafter. Preferred films include polyester films such as condensation products of terephthalic acid and a glycol such as ethylene glycol, or isophthalic acid and a glycol, or mixtures of terephthalic acid, and isophthalic acid and a glycol. A particularly useful film of this type is the highly oriented polyester known in the trade as "Mylar" film. Other useful polymer films include films of acrylic polymers and interpolymers; cellulosic polymers, including cellulose acetate, cellulose acetate butyrate, cellulose acetate propionate and mixtures thereof; polyolefns, including homopolymers and interpolymers of ethylene or propylene; polystyrene, polycarbonates and vinyl chloride polymers, and interpolymers, including such polymers compounded with property modifying adjuvants such as those known in the film art.

On the interior surface 3 of the exterior film 2 there is reverse printed an information containing pattern 4 (thickness exaggerated in the drawing) of letters, numbers, words, designs, bar codes or other forms of human or machine readable information. The method of printing is not critical and can be any printing process useful in printing upon plastic films including flexographic, letterpress and gravure printing techniques.

The chemical composition of the ink employed to print the pattern 4 is not critical, however the ink must produce a printed pattern which has greater affinity for, i.e. adhesion to, the adhesive layer 5 than to the inner surface 3 of the outer layer 2. Generally, the ink employed has an adhesion to the outer layer 2 which would normally be considered "poor" in comparison to normal film printing standards.

A particularly useful ink is a flexographic letterpress ink consisting of 10% of a phthalocyan blue pigment and 90% of 25:75 resin-vehicle mixture, where the resin is a modified phenolic resin and the solvent consists of (by volume) 80% ethyl alcohol, 10% ethylene glycol monoethylether, and 10% n-propyl alcohol.

In a preferred embodiment of 1 mil Mylar film was reverse printed with the above ink and the printing dried by 140° F. force air through a slit nozzle ½ inch away from the printed side of the film.

The printed film was then coated on its printed side with a layer of pressure sensitive adhesive 5. The chemical composition is not critical so long as the adhesion layer will adhere sufficiently to the film 2 to provide a unitary laminate, but will adhere more strongly to the printing and to the article to which the label is affixed than the bond strength between the printing (ink) and the outer film 2.

A particularly useful pressure sensitive adhesive, useful in conjunction with the ink, described above, is a 55% solution of thermosetting acrylic solution polymer in 75% ethyl acetate and 25% toluene (by volume), having a Brookfield vicosity of between 12,000–18,000 cps at 25° C. Representative physical data of a 1 mil dry film of this adhesive applied to a Mylar film (cured at 250° F. for 2 minutes) are as follows:

Quick stick (rolling ball-incline plane)

Inches of Fall/Inches of Travel = 1.2

180° Peel Adhesion (Pressure Sensitive Tape Council Test Method PSTC-1)

Initial = 56 oz

Overnight = 76 oz

20° Hold ($\frac{1}{2}\times\frac{1}{2}$ inch adhesive strip, 20 chrome plated bar, 200 gm wt) = 19 hours 50° C. Creep ($1\times\frac{1}{2}$ inch adhesive strip attached at the vertical to stainless steel plate, 250 gm wt) = 24 + hours Williams Plastometer (100° C.) = 1.73.

The effects of the use of this adhesive, which displayed selective adhesion levels, as described above, provided a laminated label which delaminated upon removal from the article to which it is affixed. And, as shown in FIG. 2, when the film 2 was lifted from the labeled article 8, the adhesive layer 5 held the printed pattern 4 to the labeled article and the film 2 was free of all or at least a substantial part of the printed pattern. As represented in FIG. 2, the printed numbers 4 remain adhered to the adhesive layer 5, when the film 2 has been delaminated to the line *x'*—*x'*. The portion of the label to the left of the line *x'*—*x'* represents the label in its normal service appearance.

While in the embodiment described in detail the adhesion properties of the elements of the laminate are chosen so that all or substantially all of the ink is removed from the film upon which it was originally printed, inks and adhesives can be employed where the relative adhesion properties are such, that only a minor but tamper indicating amount of the printing is removed from the film on which it was originally printed. In other words, the relative adhesion properties of the elements of the laminate can be chosen so that, upon delamination, any desired proportion of the ink adheres, respectively, to the adhesive layer and to the outer layer, so long as at least a tamper indicating amount of the ink adheres to the adhesive layer, which in turn remains adhered to the article. It is further noted that while all the adhesive layer may remain adhered to the article upon delamination, it is only essential that a portion of the adhesive layer, having thereon a tamper indicating amount of ink, remain adhered to the article. Thus, it is possible that bond strength between unprinted areas of the outer sheet and the adhesive layer is such that at least a portion of the adhesive layer adheres to the unprinted area of the outer sheet and is removed with the outer sheet upon attempted removal of the label.

In yet another embodiment, the information containing pattern can be printed on the inner surface of the outer layer of the label with at least two inks having significantly different adhesion characteristics, so that, upon subsequent delamination of the label, a first ink adheres exclusively or primarily to the outer layer, while a second ink is removed from the outer layer upon which it was originally printed and adheres exclusively or primarily to the adhesive layer.

While the relative thickness of the various layers in the laminate is not unduly critical and is primarily dictated by economics and the properties desired for a particular use, typically, the outer film layer 2 will have a thickness of between about 0.5 mil and about 6 mils, while the adhesive layer will have a thickness between about 0.3 mil and about 3 mils.

To further exemplify the invention, in one embodiment, the pressure sensitive adhesive layer adhered to the object to which it is affixed with a bond strength of about 75 ounces, while the bond strength between the outer layer and the ink was about 20 ounces. The bond strength between the adhesive layer and the release paper were about 1 ounce (PSTC-1).

With reference to FIG. 1, in order that the label can be handled and stored more readily, for example, individually, in a rolled tape form, or a flexible sheet form, the object adhering surface 6 of the label 1 can be temporarily covered with a release sheet, of the type conventionally known in the art, for example, a silicone treated release paper. In a preferred embodiment the release paper is a semi-bleached release paper coated on its adhesive contacting side with a silicone release agent. As is conventional, the release agent is selected with a tight enough release level to allow the label to be conveyed to the object being labeled without premature separation of the release sheet, but with a release level low eough so that the release sheet can be readily intentionally removed to expose the adhesive layer for bonding when desired. The release level should be lower than the level of adhesion of the ink to the outer sheet to prevent delamination of the label upon removal of the release sheet.

While there has been described, above, the invention and what are now considered its best embodiments, it is understood that other materials, such as are known in the art or described, above, may be substituted for those exemplified. All parts and percentages set forth above are by weight unless otherwise specified.

I claim:

1. A laminated label comprising:
   (a) a flexible transparent or translucent plastic film,
   (b) having reverse printing on one side thereof in an information containing pattern, and
   (c) a layer of pressure sensitive adhesive bonded to the printed side of said plastic film, where
   (d) the printed information containing pattern having a greater affinity for the pressure sensitive adhesive than the plastic film,
   (e) so that when the laminated label has been mounted upon an object, attempted removal causes delamination of the plastic film and the pressure sensitive adhesive with at least a tamper indicating amount of the printed information pattern remaining adhered to at least a portion of the pressure sensitive adhesive which remains on the object.

2. A laminated label, as in claim 1, which has a release sheet covering the otherwise exposed side of the pressure sensitive adhesive layer.

3. A laminated label, as in claim 1, where the plastic film is a polyester film.

4. A laminated label, as in claim 1, wherein the affinity of the adhesive for the surface to which the laminated label is adhered and to the printed pattern is greater than the affinity of the printed pattern for the outer sheet.

5. A method of forming a laminated label which comprises:
   (a) reverse printing an information containing pattern on one side of a layer of flexible transparent or translucent plastic film,
   (b) applying a layer of pressure sensitive adhesive to said printed side of said plastic film, where said printed information containing pattern has a greater affinity for said pressure sensitive adhesive than for said plastic film so that when the laminated label has been mounted upon an object, attempted removal causes delamination of the plastic film and the pressure sensitive adhesive with at least a tamper indicating amount of the printed information pattern remaining adhered to at least a portion of the pressure sensitive adhesive which remains on the object.

6. A method, as in claim 5, wherein the affinity of the adhesive for the surface to which the laminated label is adhered and to the printed pattern is greater than the affinity of the printed pattern for the outer sheet.

* * * * *